United States Patent
Hersel et al.

(10) Patent No.: US 6,736,327 B1
(45) Date of Patent: May 18, 2004

(54) AIR CONDITIONING SYSTEM FOR THE PASSENGER COMPARTMENT OF A MOTOR VEHICLE

(75) Inventors: Walter Hersel, Leonberg (DE); Juergen Munz, Filderstadt (DE); Harald Eisenhardt, Rutesheim (DE); Reinhold Weible, Stuttgart (DE); Rolf Falliano, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/069,856

(22) PCT Filed: Aug. 23, 2000

(86) PCT No.: PCT/DE00/02878

§ 371 (c)(1), (2), (4) Date: May 15, 2002

(87) PCT Pub. No.: WO01/15920

PCT Pub. Date: Mar. 8, 2001

(30) Foreign Application Priority Data

Sep. 1, 1999 (DE) .......................................... 199 41 487

(51) Int. Cl.[7] .......................... G05D 23/00; B60H 1/02
(52) U.S. Cl. ................................. 236/51; 237/12.3 R
(58) Field of Search .............................. 236/49.3, 78 R, 236/94; 165/43, 41; 62/126

(56) References Cited

U.S. PATENT DOCUMENTS

| | | | |
|---|---|---|---|
| 5,796,332 A | 8/1998 | Steiert | 340/438 |
| 6,304,803 B1 * | 10/2001 | Dao | 701/36 |
| 6,511,342 B1 * | 1/2003 | Hein et al. | 439/502 |
| 6,577,025 B2 * | 6/2003 | Hentschel et al. | 307/10.1 |

FOREIGN PATENT DOCUMENTS

| DE | 195 45 566 A | 6/1997 | G06F/13/40 |
|---|---|---|---|
| FR | 2 561 179 A | 9/1985 | B60H/3/00 |
| FR | 2 694 848 A | 2/1994 | H02J/13/00 |

* cited by examiner

*Primary Examiner*—William Wayner
(74) *Attorney, Agent, or Firm*—Michael J. Striker

(57) ABSTRACT

The invention relates to a climate control system for the interior of a motor vehicle, having a blower regulator, heating control unit or brushless blower motor, as well as function components such as operating elements, sensors, clocking valves and adjusting drive mechanisms, which are connected to one another and to the vehicle battery via connecting lines and to which the information required to operate the blower regulator, heating control unit or brushless blower motor are transmitted. The cabling and the control/regulation are minimized and simplified by providing that the blower regulator, the heating control unit, or the brushless blower motor is combined with the function components to make a pre-wired climate control unit, to which the supply voltage of the vehicle battery; that the blower regulator, the heating control unit, or the brushless blower motor is designed in bus-capable fashion with a microcomputer, which communicates via a bus interface with a climate control operating device supplied by the supply voltage; and that the information required for operating the climate control apparatus can be transmitted between the climate control operating device and microcomputer as part of a bus protocol on the bus interface.

8 Claims, 1 Drawing Sheet

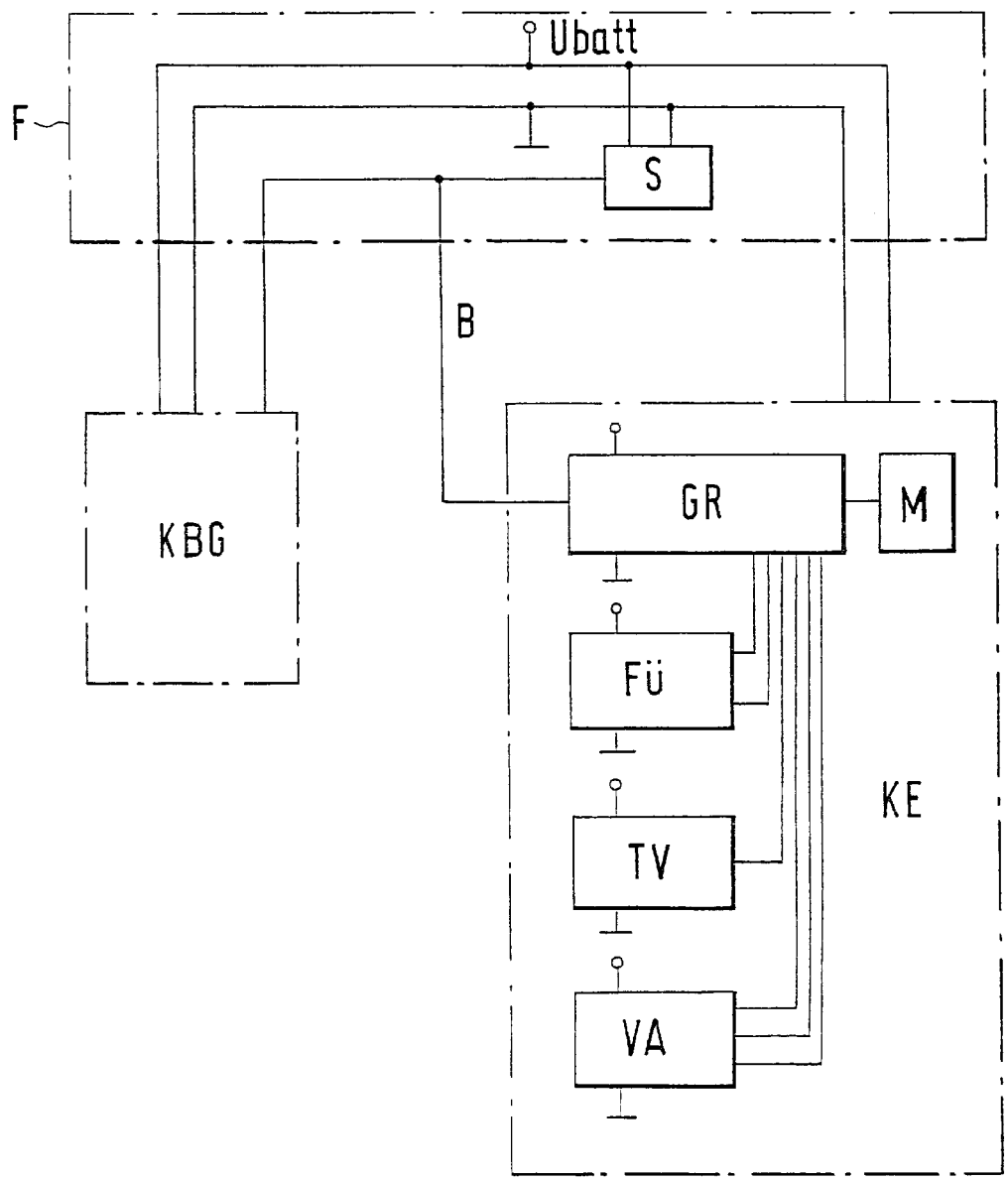

AIR CONDITIONING SYSTEM FOR THE PASSENGER COMPARTMENT OF A MOTOR VEHICLE

PRIOR ART

The invention relates to a climate control system for the interior of a motor vehicle, having a blower regulator, heating control unit or brushless blower motor, as well as function components such as operating elements, sensors, clocking valves and adjusting drive mechanisms, which are connected to one another and to the vehicle battery via connecting lines and to which the information required to operate the blower regulator, heating control unit or brushless blower motor are transmitted.

In climate control for the interior of a motor vehicle, blower regulators or brushless electric motors are used to regulate the blower power. For control/regulation, a microcomputer can also be used. To achieve improved heating after cold starting, a supplementary heater can also be provided. For these heaters, special heating control units are used, which can also have a microcomputer.

The adjusting drive mechanisms employed can be controlled by a control unit with a microcomputer.

A climate control system for the interior of a motor vehicle of the known type is characterized by many variants. The use of the following components, for instance, is known:

a) blower regulator/heating control unit with a current or voltage input;
b) blower regulator/heating control unit with PWM input;
c) diagnosis-type blower regulator/heating control units;
d) blower regulator/heating control unit with diagnostic interface;
e) brushless electric motors;
f) control units for adjusting drive mechanisms;
g) bus-capable adjusting drive mechanisms or valve controls.

In each case, climate control system for the interior of a motor vehicles with these function components require complicated cabling that has to be laid in the vehicle, with many wires that have to be laid by way of plug connections.

It is the object of the invention to create a climate control system for the interior of a motor vehicle of the type defined at the outset that can be installed in the vehicle with a minimum of cabling complication and expense.

This object is attained according to the invention in that the blower regulator, the heating control unit, or the brushless blower motor is combined with the function components to make a pre-wired climate control unit, to which the supply voltage of the vehicle battery; that the blower regulator, the heating control unit, or the brushless blower motor is designed in bus-capable fashion with a microcomputer, which communicates via a bus interface (such as a two-wire bus B) with a climate control operating device supplied by the supply voltage; and that the information required for operating the climate control apparatus can be transmitted between the climate control operating device and microcomputer as part of a bus protocol via the bus interface (such as a two-wire bus B).

By integrating the function components with the climate control unit and utilizing the blower regulator, heating control unit or brushless blower motor with the microcomputer in conjunction with the bus system, not only is the complication and expense of cabling reduced to a minimum with the bus interface and the power supply, but at the same time decisive advantages for testing the climate control unit are achieved. The climate control unit can be prefabricated in complete form and tested simply by means of the bus interface. The adjusting drive mechanisms can be calibrated and the sensors can be checked without additional effort for plugging anything in. Connecting the climate control unit requires only a single plugging operation. The prechecked climate control unit no longer needs to be checked completely after installation by the motor vehicle manufacturer. The effort and expense for assembly and testing are therefore greatly reduced. In the climate control operating device, the expense for software and hardware can be reduced, since hardware-specific requirements can be moved into a component of the climate control unit.

In a further feature, it is provided that the microcomputer of the blower regulator, of the heating control unit, or of the brushless blower motor reports diagnostic data, as part of the bus protocol, back to the climate control operating device.

Inside the prewired climate control device, for the sake of information exchange it can also be provided that the information present in the climate control unit from non-bus-capable function components is processed by the microcomputer of the blower regulator, of the heating control unit, or of the brushless blower motor and is made available as part of the bus protocol.

A further improvement can be achieved by providing that to reduce the resting current consumption, bus-capable function components in the climate control unit can be connected as a function of need to the supply voltage.

For the bus system, an embodiment that is characterized in that a standardized bus protocol includes the information for mass-production outfitting of the function components of the climate control unit is advantageous.

In one feature, the connection of the climate control unit is effected simply by providing that the climate control unit can be switched on via a three-wire plug connection.

The invention will be described in further detail in terms of an exemplary embodiment, shown in the form of a block circuit diagram in the drawing.

In the block circuit diagram, the three blocks identify the base units of the climate control system for the interior of a motor vehicle of the invention, which are connected to one another in a simple way at minimum effort and expense for cabling. In the vehicle F, Ubatt indicates the supply voltage of the vehicle battery, and S indicates a sensor on a bus line B that leads from a climate control operating device KBG of a bus system to a climate control unit KE. The climate control unit KE is prefabricated, prewired and prechecked as a complete unit, and it includes a blower regulator GR with a microcomputer, a heating control unit with a microcomputer, or a brushless blower motor with microcomputer, both of which are embodied as bus-capable and are connected to the two-wire bus B acting as a bus interface.

All the function components of the climate control apparatus are accommodated in the climate control unit KE; these components can themselves be embodied as bus-capable, as is indicated by adjusting drive mechanisms VA.

Non-bus-capable function components, such as sensors F ü and clocking valves TV, are also accommodated in the climate control unit KE; their information is converted into parts of the bus protocol by the microcomputer of the blower regulator GR, of the heating control unit, or of the brushless blower motor. Diagnostic data can be transmitted back to the climate control operating device KBG. In the case of bus-capable function components, to reduce the resting current the power supply can also be controlled as a function of need in the climate control unit KE.

The climate control unit KE can be connected via a simple three-wire plug connection in the motor vehicle. The cabling for the entire interior climate control system is especially simple, as the block circuit diagram shows.

The two-wire bus B is not laid directly to the climate control unit KE but instead, via the vehicle cabling, is also connected to a sensor S, which can be incorporated into the bus system.

It has proved especially advantageous if for mass-production outfitting of the climate control apparatus, a standardized bus system can be used.

The advantage of the climate control system for the interior of a motor vehicle with the breakdown and control/regulation according to the invention is not only the minimal effort and expense for cabling in the vehicle F but also further decisive advantages, which are based on the prefabrication and prechecking of the climate control unit KE and thus simplify the installation and checking of the climate control apparatus in the vehicle.

What is claimed is:

1. A climate control system for an interior of a motor vehicle, said climate control system comprising a climate control operating device (KBG); a blower regulator (GR), heating control unit or brushless blower motor operated by the climate control operating device (KBG) and function components (Fü, TV, VA), which are connected to one another and to a supply voltage (Ubatt) via connecting lines (B, CL) and to which information required to operate the blower regulator (GR), heating control unit or brushless blower motor is transmitted;

wherein the blower regulator (GR), heating control unit or brushless blower motor and the function components are combined to form a pre-wired climate control unit (KE), which is connected with the supply voltage (Ubatt) for supplying the blower regulator, heating control unit or brushless blower motor and the function components with the supply voltage (Ubatt);

wherein the blower regulator (GR), heating control unit or brushless blower motor is designed in bus-capable fashion with a microcomputer (M); and wherein said microcomputer communicates with the climate control operating device (KBG) via a bus interface so that said information required for operation is transmitted between said climate control operating device (KBG) and said microcomputer as part of a bus protocol via said bus interface.

2. The climate control system as defined in claim 1, wherein said bus interface is a two-wire bus (B).

3. The climate control system as defined in claim 1, wherein said microcomputer (M) of the blower regulator (GR), heating control unit or brushless blower motor reports diagnostic data, as part of the bus protocol, back to the climate control operating device (KBG).

4. The climate control system as defined in claim 1, wherein said function components include non-bus-capable components and information entities present in the climate control unit (KE) from the non-bus-capable components are processed by said microcomputer and made available as part of the bus protocol.

5. The climate control system as defined in claim 1, wherein said function components include bus-capable components, and further comprising means for connecting and disconnecting said bus-capable components from said supply voltage (Ubatt), according to need, in order to reduce idle current consumption.

6. The climate control system as defined in claim 1, wherein said bus protocol is standardized and includes data for mass-production outffitting of said function components.

7. The climate control system as defined in claim 1, wherein said climate control unit is switched on via a three-wire plug connector (TRE).

8. The climate control system as defined in claim 1, wherein said function components comprise non-bus-capable sensors (Fü), non-bus-capable clocking valves (TV) and bus-capable adjusting drive mechanism (VA).

* * * * *